US008805713B2

(12) United States Patent
Duffy et al.

(10) Patent No.: US 8,805,713 B2
(45) Date of Patent: *Aug. 12, 2014

(54) INTERFACE FOR PROJECT AND TASK SUBMISSION FOR AUTOMATED DELEGATION

(75) Inventors: Maureen Emily Duffy, Somerville, MA (US); Toshio Ernie Kuratomi, Granite Bay, CA (US); Luke J. Macken, Westford, MA (US); Evangeline A. McGlynn, Somerville, MA (US); John Palmieri, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 647 days.

This patent is subject to a terminal disclaimer.

(21) Appl. No.: 12/350,154

(22) Filed: Jan. 7, 2009

(65) Prior Publication Data

US 2010/0174578 A1    Jul. 8, 2010

(51) Int. Cl.
*G06Q 10/00* (2012.01)
(52) U.S. Cl.
USPC ........................................................ 705/7.14
(58) Field of Classification Search
USPC ........................................................ 705/7.14
See application file for complete search history.

(56) References Cited

U.S. PATENT DOCUMENTS

| 5,164,897 | A | 11/1992 | Clark et al. |
| 5,416,694 | A | 5/1995 | Parrish et al. |
| 6,049,776 | A | 4/2000 | Donnelly et al. |
| 6,275,812 | B1 | 8/2001 | Haq et al. |
| 6,347,333 | B2 | 2/2002 | Eisendrath et al. |
| 7,069,266 | B2 | 6/2006 | Calderaro et al. |
| 7,082,457 | B1 * | 7/2006 | Burianek et al. ............. 709/204 |
| 7,519,539 | B1 * | 4/2009 | Fliess et al. .................. 705/301 |
| 7,756,738 | B2 | 7/2010 | Jacobs |
| 7,797,181 | B2 | 9/2010 | Vianello |
| 7,805,382 | B2 | 9/2010 | Rosen et al. |
| 7,925,673 | B2 | 4/2011 | Beard |
| 2002/0026452 | A1 | 2/2002 | Baumgarten et al. |
| 2003/0177027 | A1 | 9/2003 | DiMarco |
| 2003/0182178 | A1 | 9/2003 | D'elena et al. |
| 2004/0215503 | A1 | 10/2004 | Allpress et al. |
| 2005/0026119 | A1 | 2/2005 | Ellis et al. |
| 2005/0049903 | A1 * | 3/2005 | Raja .................................. 705/7 |
| 2006/0008783 | A1 | 1/2006 | Whitlock-Glave |
| 2006/0195335 | A1 | 8/2006 | Christian et al. |
| 2007/0027747 | A1 | 2/2007 | Bonnstetter et al. |
| 2007/0118433 | A1 * | 5/2007 | Bess ............................... 705/26 |

(Continued)

OTHER PUBLICATIONS

Peters, Malte L., and Zelewski, Stephan, "Assignment of Employees to Workplaces Under Consideration of Employee Competences and Preferences," Management Research News, vol. 30, No. 2, 2007, pp. 84-99.*

(Continued)

*Primary Examiner* — Nathan Erb
(74) *Attorney, Agent, or Firm* — Lowenstein Sandler LLP (57) ABSTRACT

The automated task delegation and project management system tracks user profiles and project profiles, which include information about the interests and skills each user in the system possesses as well as the skills that are required by each project in the system and the characteristics of each project. This information can then be utilized to correlate user interests and skills with the available projects. Project data can be collected from the submitter to enable the automated matching. The user interface facilitates the collection and storage of the project profile data including tasks, files, resources, and tags.

20 Claims, 6 Drawing Sheets

(56) References Cited

U.S. PATENT DOCUMENTS

| | | |
|---|---|---|
| 2007/0190504 A1 | 8/2007 | Schwartz et al. |
| 2008/0275879 A1* | 11/2008 | Hammen et al. ............ 707/9 |
| 2009/0119261 A1 | 5/2009 | Ismalon |
| 2010/0094679 A1* | 4/2010 | Diehl et al. ................. 705/9 |
| 2010/0125475 A1 | 5/2010 | Twyman |
| 2010/0153289 A1 | 6/2010 | Schneiderman et al. |
| 2010/0174577 A1 | 7/2010 | Duffy |

OTHER PUBLICATIONS

USPTO, Office Action for U.S. Appl. No. 12/350,152, mailed May 24, 2011.

USPTO, Office Action for U.S. Appl. No. 12/350,152, mailed Nov. 29, 2011.

USPTO, Office Action for U.S. Appl. No. 12/350,152, mailed Jun. 21, 2012.

* cited by examiner

INTERFACE FOR PROJECT AND TASK SUBMISSION FOR AUTOMATED DELEGATION

CROSS REFERENCE TO RELATED APPLICATIONS

Cross-reference is made to a co-pending application Ser. No. 12/350,152 entitled "Automated Task Delegation Based on Skills" filed on the same date as the present application and commonly owned.

TECHNICAL FIELD

Embodiments of the present invention relate to a method and system for task management. Specifically, embodiments of the invention relate to a method and system for automatically recommending tasks to a user.

BACKGROUND

As projects get larger, the number of users that are participating at any given time can increase dramatically. As these new users become acquainted with the project it can be difficult for to find them tasks to keep them engaged in the project. This is especially true where the involvement is voluntary, such as in the context of an open source project. Often these projects involve or are divided into a large number of sub-projects each with their own resources, set of participants and goals.

For a new participant in a given project, the vast scope of the project and the number of resources, tasks and individuals involved in the project can be overwhelming. If a mentor or guide is provided to a new participant, then that mentor can help the new user navigate the project and find a useful way to contribute. However, with large projects there may be an insufficient number of mentors. In addition, it is time-consuming to identify an appropriate mentor for each new participant. As a result, many new participants are left without guidance and unable to find a useful way to contribute to the project or are unable to find the resources they need to complete project tasks. These users typically have a high turnover rate. As a result, the potential for advancing the project is diminished as opportunities are lost to engage and retain these individuals in the project.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

The automated task delegation and project management system tracks user profiles and project profiles, which include information about the interests and skills each user in the system possesses as well as the skills that are required by each project in the system and the characteristics of each project. This information can then be utilized to correlate user interests and skills with the available projects. Project data can be collected from the submitter to enable the automated matching. The user interface facilitates the collection and storage of the project profile data including tasks, files, resources, and tags.

Figure 1:
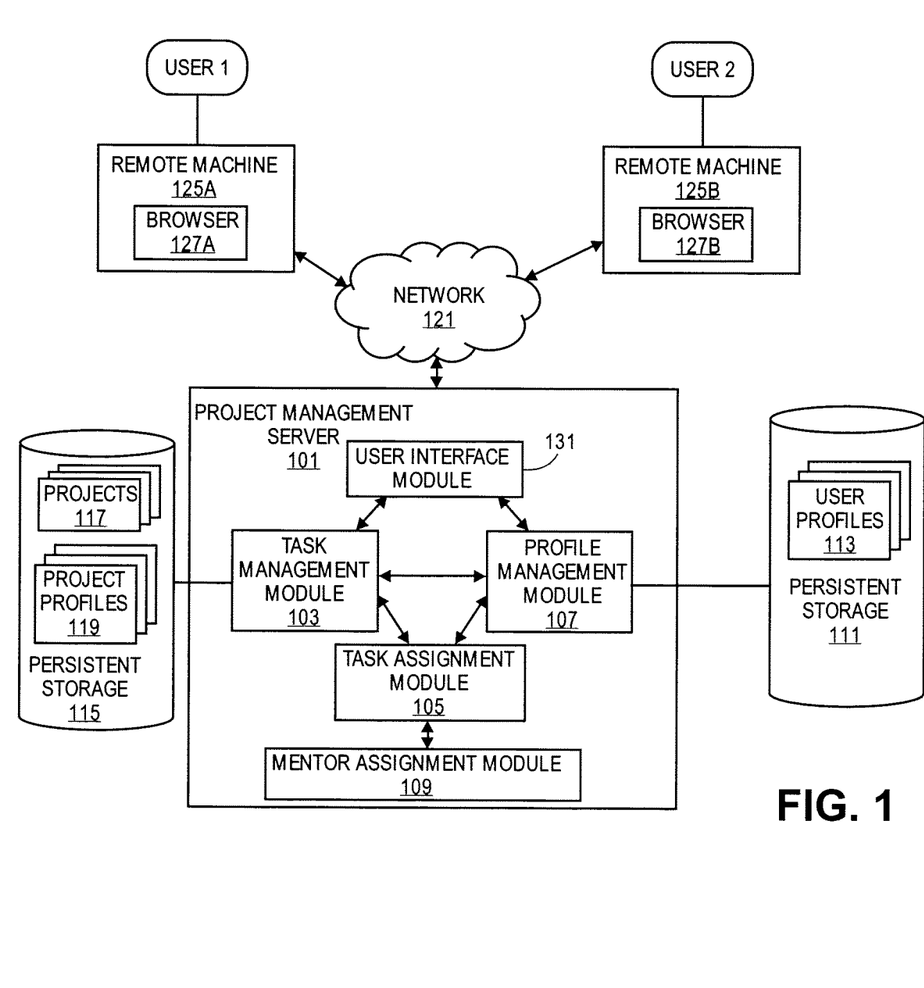
FIG. 1 is a diagram of one embodiment of the automated task delegation and project management system.

FIG. 1 is a diagram of one embodiment of the automated task delegation and management system. The system includes a project management server 101, a persistent storage unit 115 for saving project data and a persistent storage unit 111 for storing user profile data. The project management server 101 can be accessible to any number of user machines and users through a network 121. The network 121 can be local area network (LAN), such as an intranet within a company, a wide are network (WAN), such as the Internet or similar communication system. The network 121 can include any number of networking and computing devices including any number of wired and wireless devices.

The project management server 101 includes a task management module 103, profile management module 107, a task assignment module 105, mentor assignment module 109, a user interface module 131 and similar components. This division of functionality is presented by way example for sake of clarity. One skilled in the art would understand that the functionality described could be combined into a monolithic component or sub-divided into any combination of components.

The user interface module 131 provides a graphical user interface or command line interface for any number of remote machines 125A,B over the network 121. The user interface module 131 can be a web-based interface such as a web server or similar specialized interface to interact with the client on remote machines. Remote machines 125A,125B can be any type of computing device including desktop computers, laptop computers, handheld computers or similar computing device. The clients that access the user interface provided by the user interface module 131 can be general purpose browsers 127A,127B or specialized applications. The user interface module 131 interfaces the project management server 101 with the remote machines 125A, 125B by making available the functionality of the task management module 103 and profile management module 107.

The profile management module 107 allows a user to create a user profile 113 that details the biographical and professional information of the user. The information includes the skills and interests of the user. The information can also include project history of the user such as a listing of past and current projects in which the user has participated. The user profile information 113 can be utilized to match the corresponding user with tasks that the user may be interested in and have the skills to carry out. The user profiles 113 are stored in a persistent storage unit 111. The persistent storage unit 111 may be a local storage unit or a remote storage unit. The persistent storage unit 111 may be a magnetic storage unit, optical storage unit, solid state storage unit or similar storage unit. The persistent storage unit 111 can be a monolithic device or a distributed set of devices. A 'set,' as used herein, refers to any positive whole number of items including one. The user profiles 113 can be stored in a database, file system or similar data storage system.

The task management module 103 tracks the tasks assigned to a particular user and the tasks that are available in particular projects. The task management module 103 interfaces with the profile management module 107 to obtain current task assignment data for a user that is stored with the user profiles 113. In another embodiment, the task management module 103 interfaces with the task assignment module 105 to obtain current user task assignments or maintains this data itself. The task management module 103 interfaces with a persistent storage 115 that stores the projects 117 as well as the project profiles 119. The project profiles 119 are analyzed to determine the projects and associated tasks that are available and in need of servicing. The persistent storage unit 115 can be a local storage unit or a remote storage unit. The persistent storage unit 115 may be a magnetic storage unit, optical storage unit, solid state storage unit or similar storage unit. The persistent storage unit 115 can be a monolithic device or a distributed set of devices. The project profiles 119 can be stored in a database, file system or similar data storage system.

The task assignment module 105 interfaces with the task management 103 and profile management module 107 to analyze available tasks and user interest amongst other criteria to generate a set of recommended task assignments as well as correlated resources and information. The task assignment module 105 services queries from the profile management module 107, which supplies user profile 113 information. The task assignment module 105 can also request the profile management module to supply user profiles 113. Similarly, the task assignment module 105 can query the task management module 103 to obtain project profile 119 information. In another embodiment, the project profile 119 information is supplied in requests from the task management module 103. The project profiles 119 are utilized to obtain information about available task information and task characteristics information. Task assignment processing can be initiated by any service request from the task management module 103, profile management module 107 or the user interface module 131. The task assignment module 105 can also interface with the mentor assignment module 109. In another embodiment, the mentor assignment module 109 interfaces directly with the profile management module 107 or other components of the project management server 101.

The mentor assignment module 109 analyzes user interests, experience (e.g., past and current project participation) and mentor skills. Mentor assignment module 109 can identify any number of potential mentors that can service all or a portion of the mentorship needs of a particular new user. The determination of mentors can be executed in response to a request of the user or automatically generated as a suggestion for the user.

The user interface module 131 can interface with any of the other modules or components of the project management server 101 including the task management module 103, profile management module 107, task assignment module 105 and mentor assignment module 109 to generate a project guidance interface to be utilized by a new user or an established user. The user interface module 131 can be specifically designed to help a new user identify a project that matches the interests of the user, related project resources and mentors or other users that might be of interest to the user based on the specified interests and skills of the user. In one embodiment, the user interface is focused on providing assistance in getting the user involved in projects so that the user does not have to hunt for these resources themselves or find projects that match his skills. Such efforts can frustrate a user and diminish user participation.

Figure 2A:
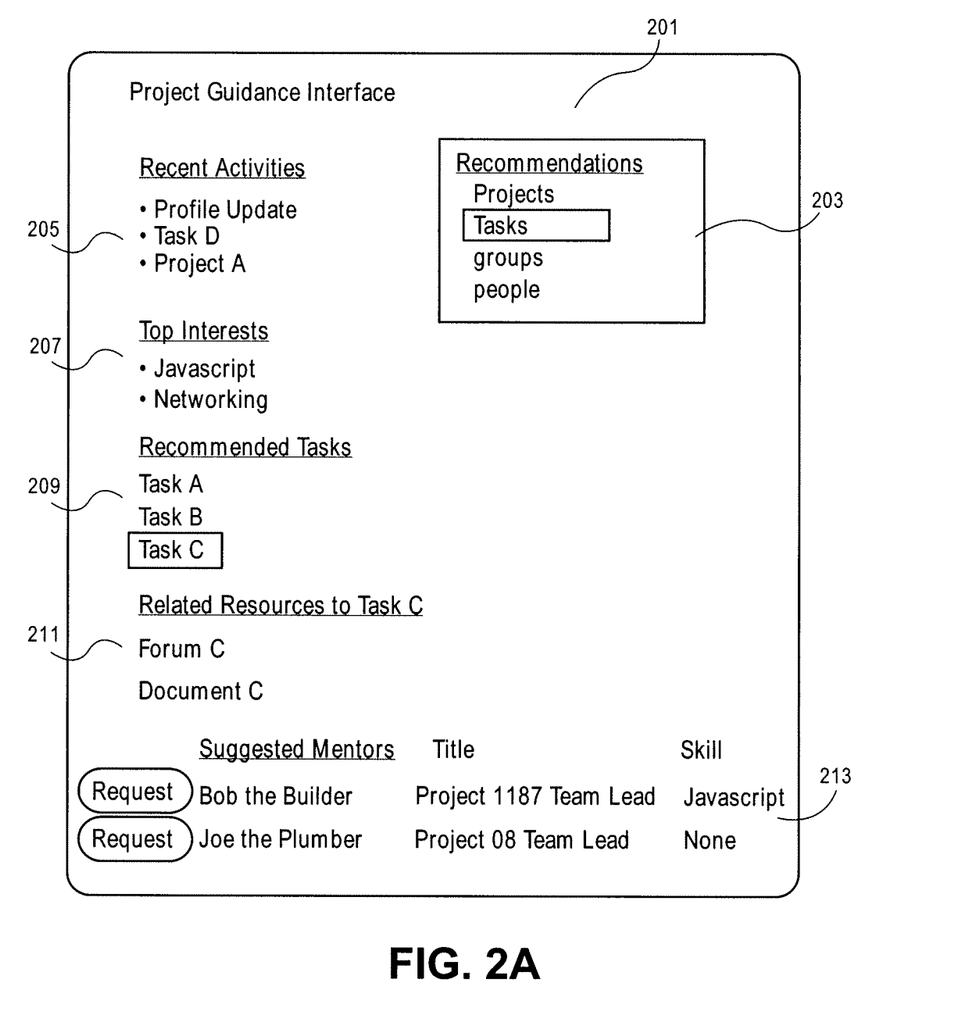
FIG. 2A is a diagram of one embodiment of a project guidance interface.

FIG. 2A is a diagram of one embodiment of a project guidance interface. The project guidance interface 201 can include any number of menus and sub-menus that are designed to assist the user in identifying projects and tasks of interests as well as the resources related to those tasks. Other information that can be provided to the user through the project guidance interface 201 can include recommendations on related groups, users with similar interests, off-line resources and similar information. In an example embodiment, the project guidance interface 201 offers a recommendations management menu 203, recent activity menu 205, a top interest menu 207, recommended task menu 209, related resource menu 211 and mentorship suggestion menu 213.

The recommendation management menu 203 is a high-level interface that enables a user to focus on different types of recommendations that might be generated by the automated task and project management system. The recommendations can be filtered to be limited to related to projects, tasks, groups, people and similar categories. In the example illustrated, the recommendations menu is set to filter recommendations such that the other menus in the interface are concentrated on finding tasks that might be of interest to the user. Similar interfaces would be generated for each of the other filter types or categories.

The recent activity menu 205 provides a listing of recent activities that the user has engaged in. A listing of the recent activities can be utilized in the project and task recommendation selection process. Recent activities can be used as a parameter for determining user interest. The listing of recent activities help remind the user of those things he has recently reviewed as well as provide an indicator of the sort of parameters that are being utilized to generate the other recommendations on the page. In one embodiment, the listing of recent activities can provide navigation links back to those resources or projects.

The top interest menu 207 provides a listing of subjects and skills that the user has shown an interest in either through exploring navigation options that are related to those interests or by specifying them in the user's profile information. The user profile information can be completely derived from collected activity information, directly input by the user or a combination of direct user input and derived information from user activities. The top interest menu 207 can be manipulated and used to rank the interests. This enables a user to assist or direct the automated task assignment and project management system to find appropriate tasks to be suggested to the user for his or her involvement.

Recommended task menu 209 includes a listing of tasks in rank order or similar order that the system believes that the user might be interested in becoming engaged in or finding out more information about. The user can select any of these tasks or highlight these tasks to alter the displays in other menus such as the related resources menu 211. The recommended task menu 209 can also be utilized to confirm an interest, request participation in or otherwise accept a listed task, which will then be automatically add to the current task list of the user and those resource associated with the task are added to the user profile. Acceptance of the task can automatically add the user to some of the related resources such as mailing lists and forums and similarly engage the user in the selected task.

Related resource menu 211 provides a listing of resources that might be of interest to the user based on his selections in other menus of the project guidance interface 211. The related resources menu 211 can display any type of resources in the form of a link or description of the resource. Resources can include forums, mailing lists, documents, project files, software components, other participants, cvs/svn/git code repositories, applications, wikis, fonts, graphics, chat logs and similar types of resources.

The suggested mentors menu 213 provides a listing of mentors that are suggested for a selected task or are generally suggested for the user based on his accepted tasks, interests and skills. Any number of mentors can be suggested and some mentors can be suggested based on certain interests, projects or skills of the user or while other mentors are suggested to provide basic orientation services or provide guidance on other aspects of the interests of the user. The suggested mentor menu 213 can include a user interface mechanism to initiate the request process for establishing a mentorship relationship. The user can select a request or similar option, which then sends a message or notification to the mentor to be approved.

Figure 2B:
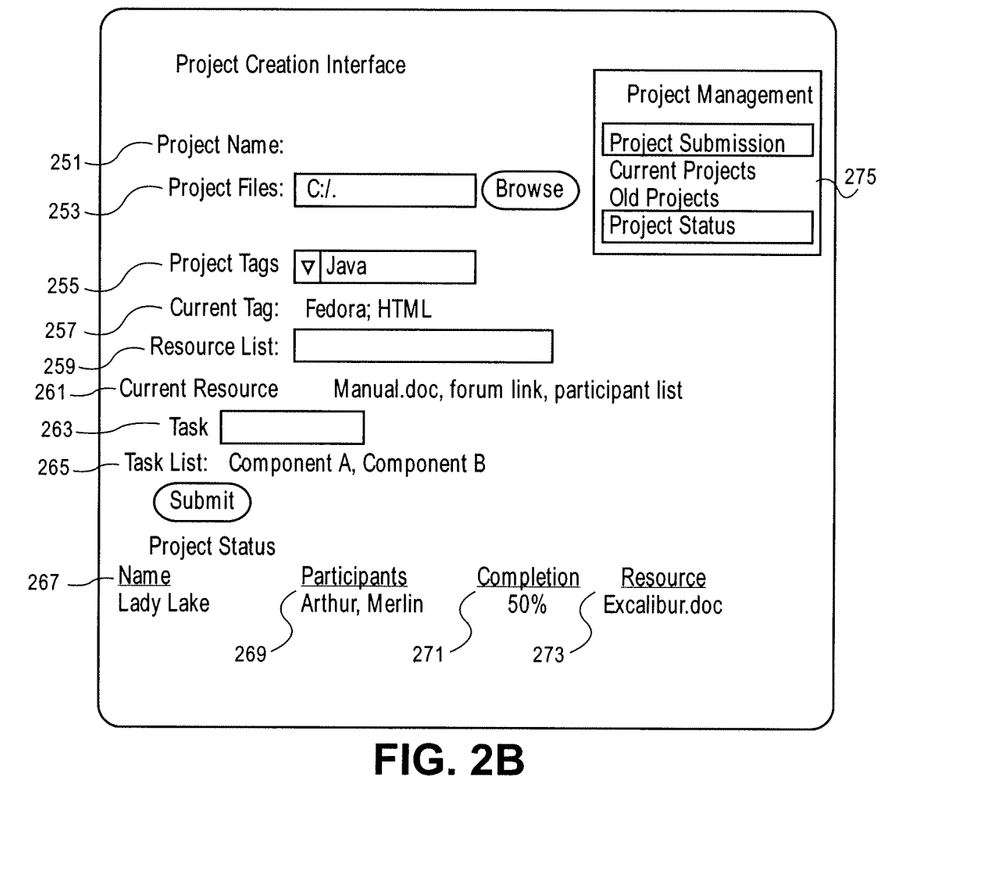
FIG. 2B is a diagram of one embodiment of a project submission and management interface.

FIG. 2B is a diagram of one embodiment of an interface for project submission and management. The interface can include any number of menus and user interface elements that are provided to assist a user such as a mentor or project owner to submit and manage a set of projects and tasks. In one embodiment, the interface includes a project management menu 275, a project creation interface, a project status interface and similar components.

The project management menu 275 provides a high-level navigation interface for selecting a set of interfaces and menus related to project creation, submission and management. The project management menu 275 in one example includes a set of menu items including navigation options for a project creation interface, detailed information about current projects, detailed information about old projects, project status overview interface and similar navigation options.

The project creation interface can include a set of fields and user interface mechanisms to facilitate the creation and definition of a new project. The project creation interface is designed to collect required project information as well as additional information on related resources and task creation. In an example embodiment, the project creation interface includes a project name field 251, a project file input mechanism 253, a project tag input mechanism 255 (e.g., to allow the definition or identification of skills necessary for a user to possess to be assigned a task or participate in a party), a project tag listing 257 (i.e., a listing of all tags selected by the user to describe the project), a resource input mechanism 259, a resource listing 261 (i.e., a listing of all resources input by the user to be associated with the project), a task input mechanism 263, a task list 265 (i.e., a listing of all tasks defined for a project as input by a user) and similar data collection elements. The project creation interface allows a user such as a mentor to define a project and a set of tasks associated with a project to be automatically delegated by the system.

A project status interface can display any set of project overview data for the projects associated with the viewer. The set of displayed data can include project name 267, participants 269, completion percentage 271, resource list 273 and similar data. The listing of data can be configured by the user of the interface to present the information that is most pertinent to the evaluation of the projects of the user.

Any number of other interfaces and user interface elements can be presented to assist a user in managing the delegation of projects and tasks that the user is entering into the system. The interfaces can also provide the user with up-to-date information on the status of each project that is created by the user.

Figure 3A:
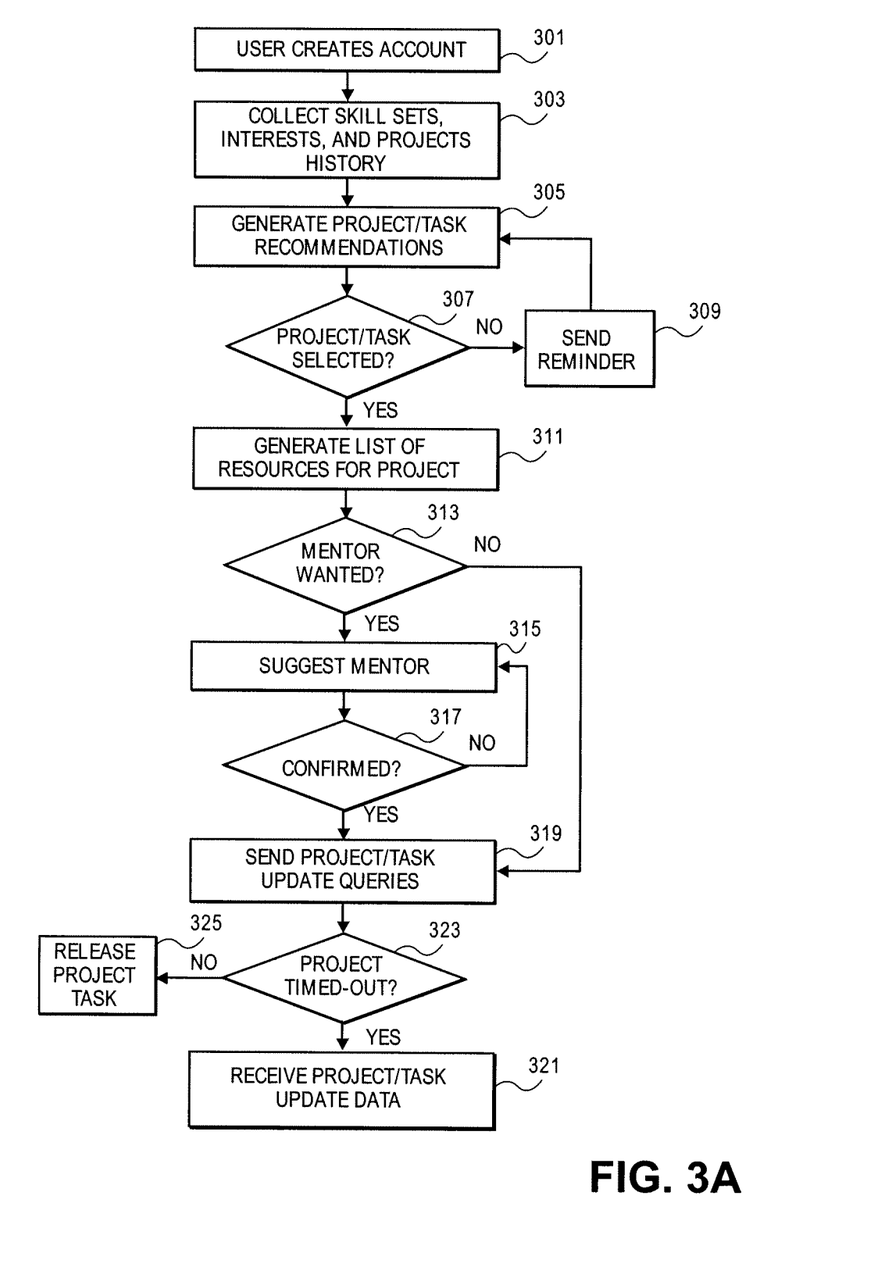
FIG. 3A is a flowchart of one embodiment of a process for matching a new user with tasks, resources and mentors.

FIG. 3A is a flowchart of one embodiment of a process for generating project recommendations, task assignments and mentorship recommendations. In one embodiment, this process can be initiated by a user creating an account with the automated task delegation and project management system (Block 301). When the user creates the account, the user will be prompted to provide information about the interests, skills, current and past project participation and other biographical or professional information of the user that can be leveraged to engage the user with the overall project. This data is stored in a user profile, which can be utilized by the other components of the system to generate task assignments and recommendations as well as mentorship recommendations (Block 303).

A set of project recommendations or task recommendations are generated (Block 305). These task recommendations are based on the input set of skills, interests, project history and similar criteria for the user. They are matched against a set of tags or similar descriptors that identify the requisite skills, subject matter and similar aspects of the projects and tasks that are stored in the project profiles. This recommendation can be generated at a time that the user creates a profile or can be generated when the user accesses the project guidance interface. In one example embodiment, the user would provide their perceived level of skill and amount of experience in terms of time on a scale of 1 to 5, where 1 indicates the least amount of skill/experience and 5 indicates the highest level of skill/experience, for a list of skills that may include specific skill areas (such as programming languages or methods of programming), general skill areas (general fields such as graphic art, programming, or teaching), and tools (such as a particular piece of software or a particular technique). For each skill, the user's overall skill level would be on a scale of 1-10, calculated by adding the perceived level of skill and amount of experience ratings provided by the user. In addition to the overall skill level, each user will have a list of tags that represent his or her interests, provided by the user. As users take on projects using this system, each project associated with the user will be stored against that user's profile, and classified as either 'completed,' 'in-progress,' or 'bailed-out.' All of the tags associated with a project will then be aggregated into one of three tag lists associated with the user under those three classifications: a list of tags associated with 'completed' projects, a list of tags associated with 'in-progress' projects, and a list of tags associated with 'bailed-out' projects. Finally, in addition to the overall skill ratings, list of user interest tags, and three lists of 'completed', 'in-progress', and 'bailed-out' project tags, some basic statistics about the user's project history will be stored against their profile. These statistics will include: (1) a project completion rate expressed as a percentage of completed to total projects taken on; (2) a project bailout rate expressed in terms of projects the user left prematurely against the total number of projects the user signed up for; (3) a per tag completion rate, expressed as a percentage of the projects associated with the given tag that were completed in comparison to the total number of projects associated with the given tag that the user signed up for. In this example embodiment, users would be assigned a compatibility rank with respect to a particular project in the system based these described data points. In this example embodiment, this rank would be calculated based on the combination of a skill match rating, an interest match rating, and a user completion match rating. The skill match rating would be calculated by examining the list of required skills the project proposer listed for the project and comparing the user's overall skill level for those skills. For n required skills, skill match rating is x/n where x is equal to n if the user overall skill level is greater or equal to the required skill level, and where x is equal to the user's overall skill level divided by the required skill level if the user overall skill level is less than the required skill level. The interest match rating would be calculated by examining the tags associated with the project in comparison to the user's interest tags. The interest match rating for n tags in the project tags list is x/n, where x is equal to the number of tags in both lists that are the same between both lists. Finally, the user completion match rating would be calculated by examining the tags associated with the given project in comparison with the user's completion rate for that tag. For n tags in the project's tags that have a completion rating in the user's profile, the user completion match is x/n where x is the user's completion rate percentages for each of the n tags, each divided by 100 and added together. The final compatibility rank between user and project is the addition of the user's project skill match rating with the user's project interest match rating and with the user's completion match rating—each expressed in terms of percentage is divided by 100, added to one another, and divided by 3.

The system then waits for a task selection (Block 307). If a user has not made a project or task selection within a given time period then a reminder to the user to try and re-engage the user in the process might be automatically sent (Block 309). The message may be an email, text message or similar message that prompts the user to re-initiate his interest in participating in the project. This notification process and time period can be external to any specific session where the user interfaces with the system. The time period can be initiated to the last system interaction and run for any specified duration of time.

Once the user has selected a project, then a list of resources can be generated for that project. This list of resources can be presented through the project guidance interface with other menus, user interface options or messages that are made available to the user (Block 311). This presentation of related resources through the project guidance interface or similar user interface simplifies the process for the user to obtain the information necessary for carrying out the selected task or project.

A query is presented to the user through the project guidance interface or similar interface to determine whether the user is interested in obtaining a mentor (Block 313). In other embodiments, the user may not be asked whether a mentor is desired. Rather, a mentor is suggested without querying the user or the mentor is sent a message with a request to contact the user. In either case, the system identifies the mentor based on matching sets of skills, interests, project history and similar criteria (Block 315).

If a mentor is selected or assigned, then a handshake process has to be executed to confirm the mentorship assignment whereby a message is sent to the mentor to confirm the mentors participation in the requested mentorship. After the mentor accents, a confirmation is sent back to the original requester or user. Once the mentorship relationship is confirmed the process continues. If the hand shake process fails, then the a new mentor is selected or recommended. This process can continue until a mentorship is confirmed or until the user indicates that he is not interested in any mentorship.

Once a project or task has been confirmed or accepted by a user, the system periodically sends an update or query to the user to determine whether or not project or task is completed (Block 319). In one embodiment, the user is given an allotted time or time-out period in which to provide updates on the status of the project or task or to complete the task (Block 323) The user may be sent reminders leading up to the expiration of the time-out period. If the time-out period expires, then the project or task can automatically be released back into a pool of available projects or tasks to be reassigned (Block 325). If the user provides update information, then the user can be provided with a specific interface for responding to the request so that the automated task delegation and project management system can keep up-to-date information about the status of all projects and then attempt to engage the user by suggesting new projects (Block 321).

Figure 3B:
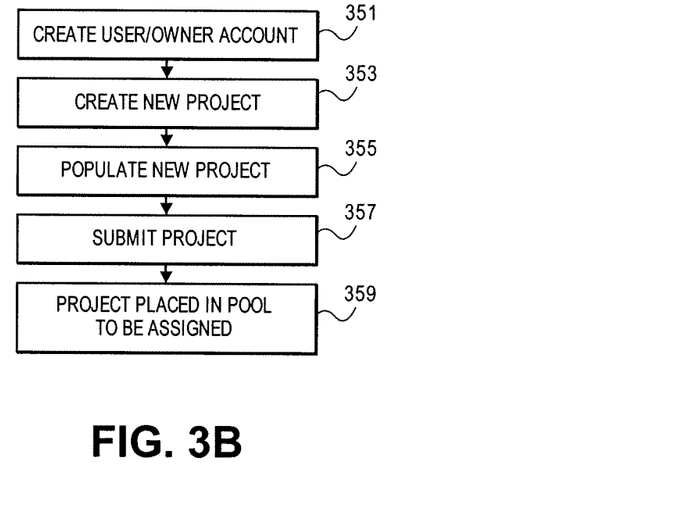
FIG. 3B is a flowchart of one embodiment of a process for project submission and preparation for delegation.

FIG. 3B is a flowchart of one embodiment of a process for project submission and preparation for delegation. The process can be initiated by a user such as a mentor or owner of a project when the user creates an account with the automated project delegation and management system (Block 353). Any user of the system with an account can create and manage projects. In another embodiment, the creation and management of projects is a restricted privilege.

Once an account is created, the user can create a new project through a project creation interface that is provided by the user interface module and task management module (Block 355). The project creation interface collects the requisite information about the project including a set of tasks associated with the project, the files that constitute the current status of the project, a set of tags that describe the skills and experience needed for the project for purposes of the matching algorithm, a set of related resources that assist user assigned to the project and similar project information.

A project with each of the requisite data points defined can then be submitted to the automated project delegation and management system (Block 357). Submitting the project places the project and the associated tasks into a pool for assignment by the matching algorithm (Block 359), creates a project profile that is stored in the persistent storage, uploads the specified files and resources into the persistent storage and similar imports the project and its constituent parts into the system.

Figure 4:
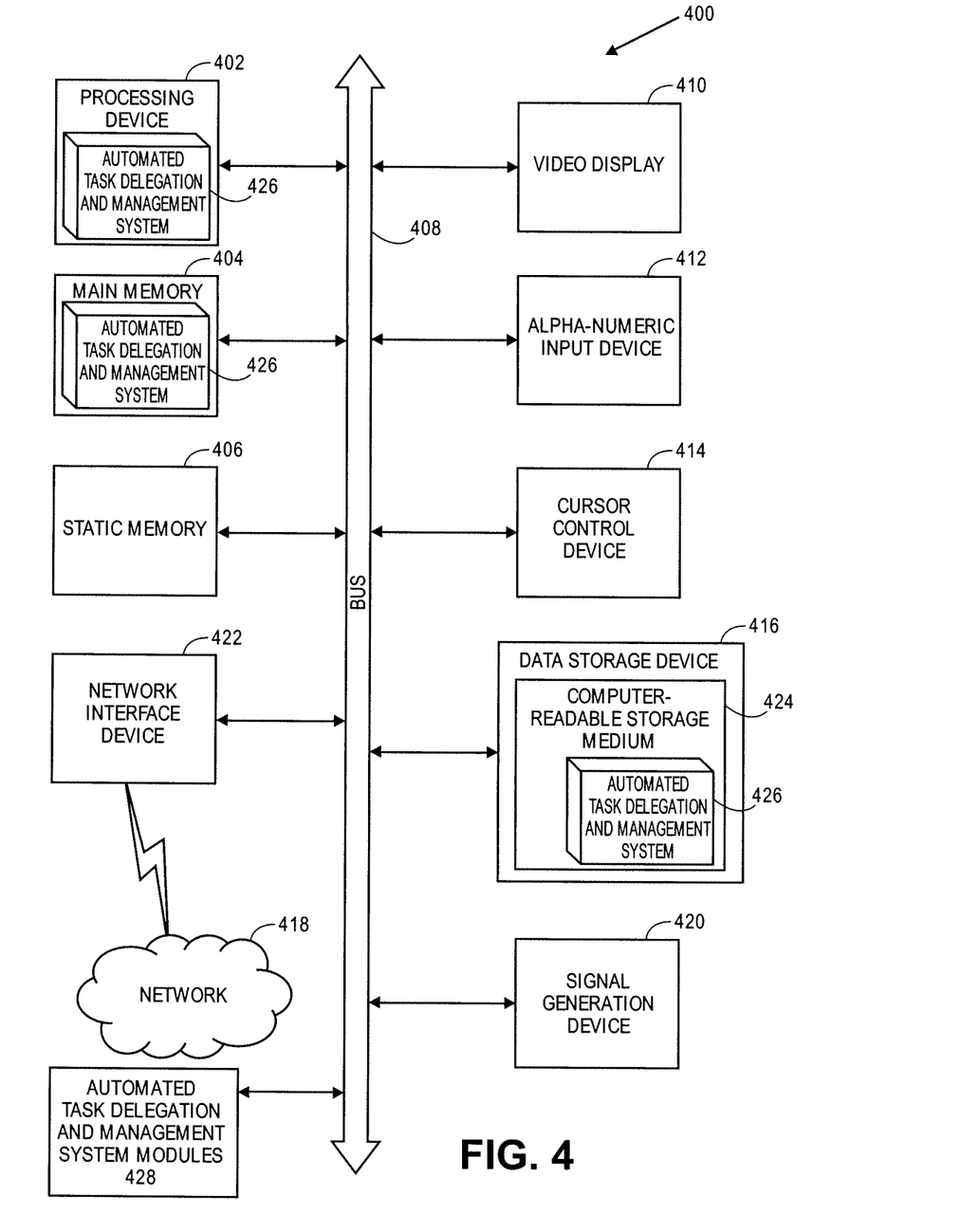
FIG. 4 is a diagram of one embodiment of the automated task and delegation and project management system

FIG. 4 is a diagram of one embodiment of a computer system for automated task delegation and project management. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the automated task delegation and project management system 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the automated task delegation and project management system 426) embodying any one or more of the methodologies or functions described herein. The automated task delegation and project management system 426 may also reside, completely or at least partially, within the main memory 404 and/or within the processing device 402 during execution thereof by the computer system 400, the main memory 404 and the processing device 402 also constituting machine-readable storage media. The automated task delegation and project management system 426 may further be transmitted or received over a network 418 via the network interface device 422.

The computer-readable storage medium 424 may also be used to store the automated task delegation and project management system 426 persistently. While the computer-readable storage medium 426 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 428, components and other features described herein (for example in relation to FIG. 1) can be implemented as discrete hardware components or integrated in the functionality of hardware components such as ASICS, FPGAs, DSPs or similar devices. In addition, the modules 428 can be implemented as firmware or functional circuitry within hardware devices. Further, the modules 428 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "matching," "collecting," "uploading," "storing," "placing," "presenting," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for automated task delegation and project management has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:

generating, by a user interface module of a project management system executing on a processing device, an interface to collect project profile data and to import a project into the project management system;

receiving, by the processing device, a designation of a plurality of skills and a plurality of interests for the project through the user interface module, wherein the plurality of interests are generated for a plurality of users in view of projects completed by the plurality of users;

storing the project profile data in a data store associated with the project management system, wherein the project profile data comprises the designation of the plurality of skills and the plurality of interests for the project and at least one of a project task, a project file, a project resource, or a project tag, wherein the data store stores user profile data for the plurality of users, wherein the user profile data comprises identified skills and interests for the plurality of users;

matching, by the project management system, the imported project with a user from the plurality of users in view of the designation of the plurality of skills and the plurality of interests for the project and the stored user profile data, wherein the matching is performed without user input to match the imported project with the user, wherein the matching comprises:

calculating a user's project skill match rating in view of a comparison between the designation of the plurality of skills for the project and the user's overall skill level for those skills;

calculating the user's project interest match rating in view of the number of interests in common between designations of the plurality of interests for the project and the identified interests for the user;

calculating the user's completion match rating in view of the user's completion rates for tags representing descriptive aspects of the project;

calculating a final compatibility rank based the user's projects skill match rating, the user's project interest match rating, and the user's completion match rating; and matching the imported project with a user from the plurality of users in view of final compatibility ranks of at least two of the plurality of users;

presenting a mentorship recommendation for the user in view of at least one of the designation of the skills and interests for the project, the stored user profile data, or the matched project;

transmitting a status update request to the user, after the user has accepted the project, to determine a status of the project; and presenting a project status overview of the project to a project owner.

2. The method of claim 1, further comprising:

collecting a set of one or more tasks associated with the project; and matching at least one of the set of tasks with at least one of the plurality of users.

3. The method of claim 1, further comprising collecting a set of resources associated with the project.

4. The method of claim 1, further comprising receiving a designation of a set of one or more project files associated with the project.

5. The method of claim 4, further comprising:

uploading the set of project files by the program management system; and storing the set of project files in the data store, wherein the data store is a persistent storage.

6. The method of claim 1, further comprising placing the imported project into a pool of projects to await said automated matching.

7. The method of claim 1, wherein the project status overview comprises a participant list including the matched user.

8. A non-transitory computer-readable storage medium including instructions that, when executed by a processing device, cause the processing device to perform a set of operations comprising:

generating, by a user interface module of a project management system executing on a the processing device, an interface to collect profile project data and import a project into the project management system;

receiving a designation of a plurality of skills and a plurality of interests for the project through the user interface module, wherein the plurality of interests are generated for a plurality of users in view of projects completed by the plurality of users;

storing the project profile data in a data store associated with the project management system, wherein the project profile data comprises the designation of the plurality of skills and the plurality of interests for the project and at least one of a project task, a project file, a project resource, or a project tag, wherein the data store stores user profile data for the plurality of users, wherein the user profile data comprises identified skills and interests for the plurality of users;

matching, by the project management system, the imported project with a user from the plurality of users in view of the designation of the plurality of skills and the plurality of interests for the project and the stored user profile data, wherein the matching is performed without user input to match the imported project with the user and wherein the matching comprises:

calculating a user's project skill match rating in view of a comparison between the designation of the plurality of skills for the project and the user's overall skill level for those skills;

calculating the user's project interest match rating in view of the number of interests in common between designations of the plurality of interests for the project and the identified interests for the user;

calculating the user's completion match rating in view of the user's completion rates for tags representing descriptive aspects of the project;

calculating a final compatibility rank based the user's projects skill match rating, the user's project interest match rating, and the user's completion match rating; and matching the imported project with a user from the plurality of users in view of final compatibility ranks of at least two of the plurality of users;

presenting a mentorship recommendation for the user in view of at least one of the designation of the skills and interests for the project, the stored user profile data, or the matched project;

transmitting a status update request to the user, after the user has accepted the project, to determine a status of the project; and presenting a project status overview of the project to a project owner.

9. The non-transitory computer-readable storage medium of claim 8, having further instructions thereon, which when executed cause the computing system to perform a set of operations, further comprising:
collecting a set of one or more tasks associated with the project; and
matching at least one of the set of tasks with at least one of the plurality of users.

10. The non-transitory computer-readable storage medium of claim 8, having further instructions thereon, which when executed cause the computing system to perform a set of operations, further comprising collecting a set of resources associated with the project.

11. The non-transitory computer-readable storage medium of claim 8, having further instructions thereon, which when executed cause the computing system to perform a set of operations, further comprising receiving a designation of a set of one or more project files associated with the project.

12. The non-transitory computer-readable storage medium of claim 11, having further instructions thereon, which when executed cause the computing system to perform a set of operations, further comprising:
uploading the set of project files by the program management system; and
storing the set of project files in the data store, wherein the data store is a persistent storage.

13. The non-transitory computer-readable storage medium of claim 8, having further instructions thereon, which when executed cause the computing system to perform a set of operations, further comprising placing the imported project into a pool of projects to await said automated matching.

14. The non-transitory computer-readable storage medium of claim 8, wherein the project status overview comprises a participant list including the matched user.

15. An apparatus comprising:
a memory to store instructions; and
a processing device, coupled to the memory, wherein the processing device is to execute the instructions to perform operations comprising:
generate, by a user interface module of a project management system executing on the processing device, an interface to collect profile project data and import a project into the project management system;
receive, by the processing device, a designation of a plurality of skills and a plurality of interests for the project through the user interface module at a profile management module, wherein the plurality of interests are generated for a plurality of users in view of projects completed by the plurality of users;
store the project profile data in a data store associated with the project management system, wherein the project profile data comprises the designation of the plurality of skills and the plurality of interests for the project and at least one of a project task, a project file, a project resource, or a project tag, wherein the data store stores user profile data for the plurality of users, wherein the user profile data comprises identified skills and interests for the plurality of users;
match, by the project management system, the imported project with a user from the plurality of users in view of the designation of the plurality of skills and the plurality of interests for the project and the stored user profile data, wherein the matching is performed without user input to match the imported project with the user and wherein the matching comprises:
calculating a user's project skill match rating in view of a comparison between the designation of the plurality of skills for the project and the user's overall skill level for those skills;
calculating the user's project interest match rating in view of the number of interests in common between designations of the plurality of interests for the project and the identified interests for the user;
calculating the user's completion match rating in view of the user's completion rates for tags representing descriptive aspects of the project;
calculating a final compatibility rank based the user's projects skill match rating, the user's project interest match rating, and the user's completion match rating; and
matching the imported project with a user from the plurality of users in view of final compatibility ranks of at least two of the plurality of users;
present a mentorship recommendation for the user in view of at least one of the designation of the skills and interests for the project, the stored user profile data, or the matched project;
transmit a status update request to the user, after the user has accepted the project, to determine a status of the project; and
present a project status overview to a project owner.

16. The apparatus of claim 15, wherein the plurality of interests generated for the plurality of users is further in view of user interactions with a project guidance interface.

17. The apparatus of claim 15, wherein the processing device further executes the instructions to:
upload the set of project files by the program management system; and
store the set of project files in the data store, wherein the data store is a persistent storage coupled to the apparatus.

18. The apparatus of claim 15, further comprising a remote machine coupled to the apparatus by a network, the user accessing the project management system from the remote machine.

19. The apparatus of claim 15, wherein the project status overview comprises a participant list including the matched user.

20. The apparatus of claim 15, wherein the processing device is to further execute instructions to perform operations to:
upload the set of project files by the program management system; and
store the set of project files in the data store, wherein the data store is a persistent storage.

* * * * *